(12) United States Patent       (10) Patent No.:     US 8,434,020 B2
Martyn                          (45) Date of Patent:    Apr. 30, 2013

(54) COMPUTING DEVICE WITH IMPROVED
     USER INTERFACE FOR APPLICATIONS

(75) Inventor: Mathieu Kennedy Martyn, London (GB)

(73) Assignee: Core Wireless Licensing S.a.r.l., Luxembourg (LU)

( * ) Notice: Subject to any disclaimer, the term of this patent is extended or adjusted under 35 U.S.C. 154(b) by 2088 days.

(21) Appl. No.: 10/343,333

(22) PCT Filed: Jul. 27, 2001

(86) PCT No.: PCT/GB01/03387
     § 371 (c)(1),
     (2), (4) Date: Aug. 27, 2003

(87) PCT Pub. No.: WO02/10893
     PCT Pub. Date: Feb. 7, 2002

(65) Prior Publication Data
     US 2004/0051726 A1    Mar. 18, 2004

(51) Int. Cl.
     *G06F 3/048*    (2006.01)
(52) U.S. Cl.
     USPC ........................................ 715/808
(58) Field of Classification Search ............. 715/762, 715/776, 759, 808
     See application file for complete search history.

(56) References Cited

U.S. PATENT DOCUMENTS

| 5,815,142 | A  | * | 9/1998  | Allard et al. ............... 345/173 |
| 6,121,968 | A  | * | 9/2000  | Arcuri et al. ............... 715/825 |
| 6,144,863 | A  |   | 11/2000 | Charron                               |
| 6,160,554 | A  | * | 12/2000 | Krause ......................... 715/804 |
| 6,456,841 | B1 |   | 9/2002  | Tomimori                              |
| 6,512,525 | B1 | * | 1/2003  | Capps et al. ................... 715/762 |
| 6,570,596 | B2 | * | 5/2003  | Frederiksen .................. 715/808 |
| 6,781,611 | B1 | * | 8/2004  | Richard ....................... 715/779 |

FOREIGN PATENT DOCUMENTS

| EP | 0 607 731 A2  | 7/1994 |
| EP | 0 844 553 A1  | 5/1998 |
| EP | 0 891 066 A2  | 1/1999 |
| EP | 0 946 028 A2  | 9/1999 |
| GB | 2 335 822 A   | 3/1998 |
| JP | 3-149666 A    | 6/1991 |
| JP | 11-74985 A    | 3/1999 |
| JP | 2000-036856   | 2/2000 |

OTHER PUBLICATIONS

IBM Technical Disclosure Bulletin; vol. 37; No. 02B; Feb. 1994 "Reorganizing Menu Hierachy to Best Fit the Individual User"; pp. 349-350.
Office Action for Japanese Patent Application No. 2002-515554; Date of Transmission: Dec. 21, 2010; 4 pages.
Office Action for Japanese Application No. 2002-515554 dated Aug. 8, 2011.

(Continued)

*Primary Examiner* — Thanh Vu

(57) ABSTRACT

The present invention offers a snap-shot view which brings together, in one summary window, a limited list of common functions and commonly accessed stored data which itself can be reached directly from the main menu listing some or all applications. This yields many advantages in ease and speed of navigation, particularly on small screen devices.

27 Claims, 1 Drawing Sheet

OTHER PUBLICATIONS

English translation of Japanese literature (bibliography: Arioka Osamu, "Windows CE carnival, using fast- and light-mobile phones toughly", Mobile PC, Softbank Corp, Mar. 1, 1999, vol. 5, No. 3, p. 82-83), 4 pages total (numbered 1/4-4/4).

Japanese literature (bibliography: Arioka Osamu, "Windows CE carnival, using fast- and light-mobile phones toughly", Mobile PC, Softbank Corp, Mar. 1, 1999, vol. 5, No. 3, p. 82-83), 14 pages total (numbered 2/15 through 15/15).

English translation of Japanese literature (bibliography: Arioka Osamu, "Windows CE carnival, using fast- and light-mobile phones toughly", Mobile PC, Softbank Corp, Mar. 1, 1999, vol. 5, No. 3, p. 82-83), 8 pages total.

* cited by examiner

COMPUTING DEVICE WITH IMPROVED USER INTERFACE FOR APPLICATIONS

CROSS REFERENCE TO RELATED APPLICATIONS

This application claims the priority of PCT Application No. PCT/GB01/03387 filed Jul. 27, 2001 and British application GB 0019459.7 filed Jul. 28, 2000.

BACKGROUND OF THE INVENTION

1. Field of the Invention

This invention relates to a computing device with an improved user interface for applications. The term 'computing device' refers to any kind of device which can process and display information. The invention has specific application to mobile telephones. The term 'mobile telephone' refers to any kind of mobile device with communications capabilities and includes radio (mobile) telephones, smart phones, communicators, PDAs and wireless information devices. It includes devices able to communicate using not only mobile radio such as GSM or UMTS, but also any other kind of wireless communications system, such as Bluetooth.

2. Description of the Prior Art

One of the problems facing the designers of computing devices with small screens is how to allow the user to navigate quickly and efficiently to access data and activate a desired function. Computing devices with small screens tend to need data and functionality divided into many layers or views: for example, the small display size of mobile telephones has conventionally meant that several hierarchies of functions have to be offered to a user. The interface can be thought of as having many layers, with the user having to first locate the correct top level function and then, within that function, progressively drill down (sometimes through 3 or more layers) to complete the required task. Where a mobile telephone includes several different applications (e.g. a message application, a contacts/address book application, a calendar application and a telephone application), then the user normally has to first of all locate, then start/open the required application and then may need to navigate to the required function (e.g. create a new contact entry) or cause the required stored data (e.g. display names beginning with the letter 'A') to be displayed. This process can seem slow, complex and difficult to learn, particularly to novice users.

Hence, with conventional user interfaces, a user may need to scroll around and switch views many times to find the right data/functionality. An effective user interface would ideally enable the user to readily and rapidly access the right data/functionality. Designing such an interface is however a complex human factors problem, especially for computing devices such as mobile telephones.

In some mobile telephones, a menu of several available options is displayed: the menu commands may then be divided into functional groups, with the most useful functional group at the top of the menu; the most useful command within that group is then placed at the top of group. In other devices, only one option is shown on the screen at any one time, making it harder for a user to appreciate the available options and therefore navigate effectively.

Some mobile telephones also offer limited shortcuts to get straight to a particular function. This usually involves memorising various keyboard input sequences, corresponding to different menu positions at different levels in the menu hierarchy. These shortcuts appeal only to a small number of expert users. Most mobile telephones also include idle screens (i.e. a display which is shown when the mobile telephone is switched on but not in use); these idle screens often carry alerting messages (e.g. "1 missed call").

On a more theoretical basis, a user interface typically has to demonstrate or make explicit the changing internal status of the mobile telephone as navigation proceeds. For example, to select or initiate a function (e.g. to open an address book function, enter a PIN security number or to alter the ring melody) a user has to understand (a) how to navigate to that function in order to select that function and (b) that the status of the telephone is such that the function can be selected or initiated. The technical problem of effectively enabling the user to understand this changing internal state has to date been inadequately addressed. The object of the present invention is to provide an improved form of user interface which addresses this problem

SUMMARY OF THE PRESENT INVENTION

According to a first aspect of the invention there is provided a computing device comprising a display screen, the computing device being able to display on the screen an application summary window, the summary window comprising a limited list of (i) common functions offered within an application and/or (ii) data stored in that application.

Hence, the present invention envisages, in one implementation, a 'snap-shot' view of an application in which the snap-shot view brings together, in one summary window, a limited list of common functions and commonly accessed stored data.

Preferably, where the summary window for a given application shows data or a function of interest, the user can directly select that data or function; this causes the application to open and the user to be presented with a screen in which the data or function of interest is prominent. This saves the user from navigating to the required application, opening it up, and then navigating within that application to enable the data of interest to be seen or a function of interest to be activated.

In another aspect, there is a computer program which when running on a computing device (such as a mobile telephone), enables the device to operate in accordance with the above aspects of the invention. The program may be an operating system.

BRIEF DESCRIPTION OF THE FIGURES

The invention will be described with reference to the accompanying Figures, in which.

DETAILED DESCRIPTION

The present invention offers, in one implementation, a snap-shot view which brings together, in one summary window, a limited list of common functions and commonly accessed stored data which itself can be reached directly from the main menu listing some or all applications. This yields many advantages in ease and speed of navigation, particularly on small screen devices. For example, a user can get to the summary window in just two steps—first, launch a main view which shows various applications; then, launch the appropriate summary window for the application of interest. This is far faster and easier than conventional navigation approaches. Once the summary window is launched, core data/functionality is displayed and can be accessed in more detail can typically be reached simply by selecting that data/functionality. Hence, only three steps may be needed from start up to reaching the required data/functionality; navigating from between each step is clear and straightforward.

Figure 1:
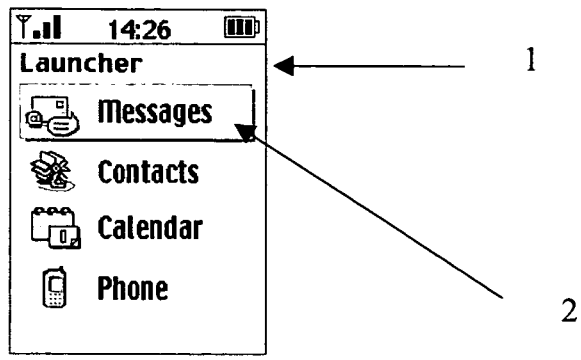
FIGS. 1-3 are screen shots showing an implementation of the present invention.

As an example, the main view may be an Application Launcher for several applications such as 'Messages', 'Contacts', 'Calendar' and 'Phone'. The Application Launcher view is then presented as a standard scrolling list of application names with appropriate application icons next to them. The list is vertical and only one application is presented per line. Standard highlight functions apply in that when the Application Launcher view is opened the highlight defaults to the first item in the list of applications. This is shown in FIG. 1, in which the screen display 1 includes a list of applications ('Messages'; 'Contacts'; 'Calendar'; and 'Phone'), including a highlighted 'Messages' at 2. Alternatively, the highlight may default to the middle item in the list of applications. At this point, the user may take conventional navigation steps, such as scrolling, to move the highlight and using the available select function to navigate to the required highlighted application.

Figure 2:
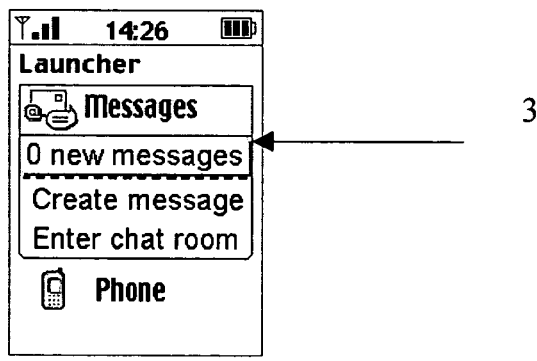
Figure 3:
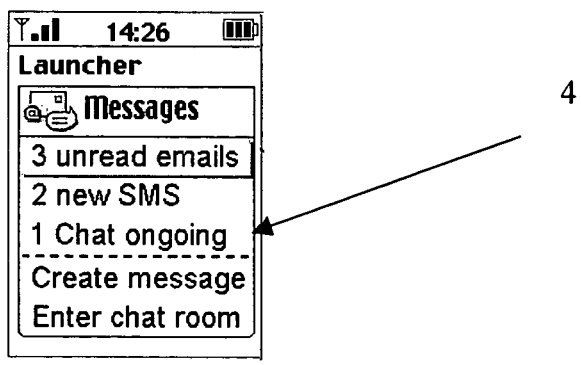

The innovative summary window functionality can be accessed as follows: should the highlight rest on the name of an application in the App Launcher for a certain amount of time (say a 1.2 second timeout), the summary window (the "App Snapshot") drops down from the highlight bar. The App Snapshot for any given application is a window which includes commonly requested data associated with that application and links to common functionality in that application. The App Snapshot is shown at 3 in FIG. 2; it includes the number of new messages ('0') and links to the two most common functions (as defined by the system designer, or selected by the user, or learned by the device) in the Messages application—'Create Messages' and 'Enter chat room'. In FIG. 3, a slightly longer App Snapshot is shown, indicating at 4 that there are '2 new SMS' messages and '1 Chat Ongoing'. Other selection processes could also be used (e.g. voice activation, softkey selection etc) to access the App Snapshot. For example, the App Snapshot may be 'called' or 'fired' by using a right scroll function (if the mobile telephone has 4-way scrolling capacity); a press and hold of the select function when an application name is highlighted; or using a right cursor key on a highlighted application name.

A highlight is available in the App Snapshot dropdown which may be scrolled in order to select a required item. When an item in the App Snapshot is selected (e.g. by being highlighted and then selected using a conventional selection technique such as pressing a right cursor), the device displays the relevant data in the application details view, or displays the relevant screen offering the relevant functionality. The required application may be automatically opened when the item in the App Snapshot is selected. The App Snapshot can therefore display data from an application and functions of that application without actually opening the application up: only once a user has selected an item in the App Snapshot associated with a given application does that application have to be opened. For example, when 'Create Messages' in an App Snapshot is selected, then the messaging application is opened up; that application does not however have to be opened up prior to that stage.

Although the term 'window' has been used to describe the drop down summary, the summary does not have to be presented within any kind of frame. Any manner of presenting the common functions offered within an application and/or data stored in that application will constitute a 'window' as such.

The App Snapshot dropdown may be dismissed in the following ways:
  If a timeout is used to call the App Snapshot, scrolling the highlight back to the relevant application name (i.e. back up to 'Messages' in FIG. 2 or 3) removes the App Snapshot. Scrolling down through the App Snapshot and off the end moves the highlight to the next application in the list (i.e. to 'Contacts' if the Messages App Snapshot has been scrolled through).
  If scroll functions (e.g. right scroll) call the App Snapshot the opposite scroll function removes the snapshot.

When a user scrolls off the end of the App Snapshot, the main list from which the App Snapshot was opened de-compresses to regain the display estate that was taken up by the App Snapshot (i.e. the screen reverts to that shown FIG. 1). If the user has scrolled up back to the application name (so that the highlight moves up), this application name stays where it was and the next main list item draws back up to abut it. If the user scrolls off the end of the App Snapshot, the highlight moves down to the next item in the main list and this item together with the highlight move up the screen to regain the App Snapshot estate (i.e. taking the place of the App Snapshot).

Another caveat regarding the main list is that when the App Snapshot opens, there will typically be one item in the main list above and below it to preserve context—(i.e. to reduce any feeling in the user of having been transported somewhere else in the UI. They have not gone anywhere yet; the App Snapshot is just showing where they could easily go to). Hence in FIG. 2, the term 'Launcher' remains at the top of the screen, and the word 'Phone' and its associated icon remains at the bottom.

App Snapshots are not intended to replace notifications, but to complement them by providing non-intrusive reminders for the user, as well as rapid shortcuts to key application functionality.

The mobile telephone may be able to learn what functionality and/or stored data types are most likely to be of interest to a given user and which should therefore be included in a summary view to any given user. Alternatively, the user or system designer may define the kinds of functionality and/or stored data to be included in the App Snapshot for a given application. The constituency of the App Snapshot can therefore vary as determined by the user and/or system designer and/or thae usage patterns of the user. The consistent goal however is for the App Snapshot to show only the most useful views and states.

Another possible feature is that the constituency of the App Snapshot may vary with the environment in which the mobile telephone finds itself. For example, if the telephone is Bluetooth enabled, then there may be a Bluetooth application which has associated with it a summary window which lists the other Bluetooth devices in the vicinity.

A further possible feature is that the constituency of the App Snapshot may vary with the actions of the user. For example, if the mobile telephone has an active Calendar application, and the user opens the App Snapshot for Contacts, then the Contacts App Snapshot may include contact information for parties in the previously or currently open Calendar application. But if the user opened the Contacts App Snapshot when the Phone application was current, then the Contacts App Snapshot may instead include contact information of the most called party, or a missed call party, or a party whose call the user is auto-replying to.

In a Messages view, when the highlight rests on a message entry, further information on that message becomes visible such as date and time it arrived and the first line/subject of the message. Rather than an App Snapshot opening here, the highlight expands to cover this extra information as well as the list item. It does this here because the extra information displayed is not 'fireable' like App Snapshot items in the application switcher.

In the Contacts manager, the App Snapshot opens (using whatever mechanism is implemented) to display phone numbers and email addresses which may be 'fired' (i.e. a phone number is dialled, an email address is seeded into a new message). The Contacts manager can have a base view—a list of names of the people stored in a device. It opens to show usable contact details like phone numbers and email addresses for each contact so you can initiate communication from here rather than navigating further within the Contacts Manager application. For example, the contact John Smith would have a snapshot which expands to show his phone number and email address. A user can scroll to the email address and hit the select button—the display then changes to a new email form seeded with his email address and all the user need do is input some body text and hit a 'Do It' button.

The present invention can also be used in systems which do not have a concept of separate applications as such. Then, the snapshot views are then views of commonly used functions and/or data, selected by the system designer, user or through a machine learning process.

As explained above, the present invention is particularly useful for mobile telephones because of their user interface constraints. However, it may also be used in environments outside of mobile telephony. For example, desktop and laptop PCs may also benefit from the present invention. The present invention may therefore be used in any computing environment, including both keyboard and keyboard-less devices.

The invention claimed is:

1. A computing device comprising a display screen, the computing device being configured to display on the screen a main menu listing at least a first application, and additionally being configured to display on the screen an application summary window that can be reached directly from the main menu, wherein the application summary window displays a limited list of at least one function offered within the first application, each function in the list being selectable to launch the first application and initiate the selected function, and wherein the application summary window is displayed while the application is in an un-launched state.

2. The computing device of claim 1 in which selecting a function listed in the summary window causes the first application to open and that selected function to be activated.

3. The computing device of claim 1 in which an application launcher lists names and/or icons of several applications and selecting one of said names or icons causes the summary window for that application to be opened.

4. The computing device of claim 1 in which the kinds of content of a summary window for a given application is selected using a process in which the device learns what functionality and/or stored data types are of interest to any given user.

5. The computing device of claim 1 in which the user can define what functionality and/or stored data types are of interest to that user for the summary window for an application.

6. The computing device of claim 1 in which the functionality and/or stored data types for a summary window for a given application varies with the environment of the device.

7. The computing device of claim 1 in which the functionality and/or stored data types for a summary window for a given application varies with the actions of the user.

8. The computing device of claim 1 in which opening a summary window for a given application does not result in that application being opened.

9. The computing device of claim 1 in which the summary window is a frame which includes the name of the first application.

10. The computing device of claim 1 in which the summary window further display a list of data stored in that application.

11. The computing device of claim 1, being a mobile telephone.

12. The computing device of claim 1, being a PC.

13. The computing device of claim 1 wherein said limited list is a sub-set of all of the functions offered by a given application.

14. The computing device of claim 13 wherein said limited list displays only functions in said sub-set and thus cannot be scrolled to reveal additional functions outside of the sub-set.

15. The computer program product according to claim 14 wherein said limited list displays only functions in said sub-set and thus cannot be scrolled to reveal additional functions outside of the sub-set.

16. A computer program product comprising a computer-readable storage medium having computer-readable code embodied in the medium which, when running on a computing device, causes the computing device to display on a screen of the device a main menu listing at least a first application, and additionally causes the device to display on the screen an application summary window that can be reached directly from the main menu, wherein the summary window displays a limited list of at least one function offered within the first application, each function in the list being selectable to launch the first application and initiate the selected function, and wherein the application summary window is displayed while the application is in an unlaunched state.

17. The computer program product of claim 16, wherein said computer-readable code comprises an operating system program.

18. The computer program product of claim 16, wherein said computer-readable code is operable such that selecting a common function listed in the summary window causes the related application to open and that selected common function to be activated.

19. The computer program product of claim 16, wherein said computer-readable code is operable to cause the screen to display an application launcher which lists the names and/or icons of several applications, wherein selecting a name or icon causes the summary window for that application to be opened.

20. The computer program product of claim 16, wherein said computer-readable code enables the kinds of content of a summary window for a given application to be selected using a process in which the device learns what functionality and/or stored data types are of interest to any given user.

21. The computer program product of claim 16, wherein said computer-readable code enables a user to define what functionality and/or stored data types are of interest to that user for the summary window for an application.

22. The computer program product of claim 16, wherein said computer-readable code enables the functionality and/or stored data types for a summary window for a given application to vary with the environment of the device.

23. The computer program product of claim 16, wherein said computer-readable code enables the functionality and/or stored data types for a summary window for a given application to vary with the actions of the user.

24. The computer program product of claim 16, wherein said computer-readable code enables the opening of a summary window for a given application without resulting in that application being opened.

25. The computer program product of claim 16, wherein said computer-readable code enables the summary window to be a frame which includes the name of the associated application.

26. The computer program product of claim 16, wherein said computer-readable code enables the summary window to further display a list of data stored in that application.

27. The computer program product according to claim 16 wherein said limited list is a sub-set of all of the functions offered by a given application.

* * * * *

UNITED STATES PATENT AND TRADEMARK OFFICE
CERTIFICATE OF CORRECTION

| | | |
|---|---|---|
| PATENT NO. | : 8,434,020 B2 | Page 1 of 1 |
| APPLICATION NO. | : 10/343333 | |
| DATED | : April 30, 2013 | |
| INVENTOR(S) | : Martyn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2222 days.

Signed and Sealed this
Twenty-third Day of December, 2014

Michelle K. Lee
*Deputy Director of the United States Patent and Trademark Office*